United States Patent Office 3,580,971
Patented May 25, 1971

3,580,971
THIXOTROPIC ORGANOPOLYSILOXANE COMPOSITIONS HAVING PENDANT METHACRYLIC ACID POLYMER
John Charles Getson, Tecumseh, Mich., assignor to Stauffer-Wacker Silicone Corporation, Adrian, Mich.
No Drawing. Filed Aug. 13, 1969, Ser. No. 849,920
Int. Cl. C08g 47/10
U.S. Cl. 260—825
6 Claims

ABSTRACT OF THE DISCLOSURE

Polymethacrylic acid graft modified siloxanes which exhibit thixotropic properties.

---

The invention relates to modified thixotropic organopolysiloxanes and more particularly to methacrylic acid graft polymerized organopolysiloxane compositions.

Heretofore, various fillers have been added to organopolysiloxane compositions to impart non-flowing properties thereto. However, many of these fillers have certain limitations, i.e., silica fillers have a tendency to score a surface in which they are in moving contact while metal soaps have melting points which are low relative to the organopolysiloxane so that the full advantage of using the organopolysiloxanes cannot be realized. Likewise, other fillers such as graphites and organic dyes impart intense color to organopolysiloxane compositions which are undesirable in many applications.

Thus, there is a definite need in the silicone industry for organopolysiloxane compositions which exhibit non-slump and thixotrophic properties and are substantially free of inorganic fillers.

Therefore, it is an object of this invention to provide organopolysiloxane compositions which exhibit thixotropy. Another object of this invention is to provide a modified organopolysiloxane which may be used alone or incorporated in other organopolysiloxane compositions to impart thixotropy thereto. Still another object of this invention is to provide polymethacrylic acid graft organopolysiloxane compositions which exhibit thixotropic properties. A further object of this invention is to provide self-priming, room-temperature-curable, methacrylic acid graft organopolysiloxane compositions containing particulate matter.

The foregoing objects and others which will become apparent from the following description are accomplished in accordance with this invention, generally speaking, by providing modified organopolysiloxanes having thixotropic properties. These modified organopolysiloxanes are prepared by contacting an organopolysiloxane with methacrylic acid in the presence of a free-radical initiator to form grafted organopolysiloxane compositions containing in situ generated particulate matter.

The methacrylic acid grafted organopolysiloxanes of this invention may be represented by the general fromula:

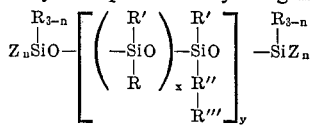

wherein R, which many be the same or different, represents monovalent hydrocarbon radicals; R' may be the same as R or may represent halogenated monovalent hydrocarbon radicals and cyanoalkl radicals; R'' is a divalent hydrocarbon radical; R''' is a polymethacrylic acid group; Z is a functional group which may be hydrolyzable or condensible, such as hydrogen, hydroxy, amino, amido, aminoxy, oximo, halogen, aryloxy, acyloxy, alkoxy or phosphato groups; n is a number of from 1 to 3; x is a number of from 0 to 20,000; and y is a number of from 1 to 500.

The organopolysiloxanes utilized in the graft polymerization may be represented by the formula:

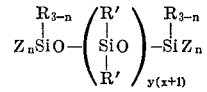

in which R, R', Z, n, x and y are the same as those described above. In the above formula, R and R', which may be the same or different, represent organic radicals, such as alkyl radicals, e.g., methyl, ethyl, propyl, butyl radicals, and aryl radicals, e.g., phenyl, tolyl and chlorophenyl radicals.

Generally, these modified organopolysiloxanes consist of a substantially linear organopolysiloxane polymer having attached thereto through a carbon-to-carbon linkage, one or more polymerized methacrylic acid side chains or branches. In preparing these compositions, hydrogen is abstracted from the organopolysiloxane polymer by free-radical initiators to form an active site for graft polymerizing methacrylic acid thereto.

The term grafting as used herein is meant to include the preparation of compositions in which some or all of the resultant polymethacrylic acid is connected to the siloxane polymer by a carbon-to-carbon linkage.

Any organopolysiloxane polymer capable of forming free radicals or active sites may be used in the grafting step. Thus, the polymer should be one which is capable of forming free radicals and should be substantially free of any tendency to undergo further polymerization under the conditions employed. Thus, the siloxane polymer should be one which is substantially free of any aliphatic unsaturation; however, a low degree of any such unsaturation does not preclude the desired reaction even though it may set up a competitive reaction which is usually preferably avoided. Preferably the organopolysiloxane polymer has lower alkyl radicals attached to the silicon atoms since these are more amenable to hydrogen abstraction than other radicals. Examples of suitable organopolysiloxane polymers and copolymers which may be used in the formation of the modified polymers are hydroxyl-terminated siloxane fluids, such as methyl-phenyl silicone fluids, copolymers or dimethylsiloxanes and methyl-, phenyl- or diphenylsiloxane units.

In addition, the organopolysiloxane polymers may be in the form of partially condensed and completely condensed polysiloxanes. Examples of completely condensed polysiloxanes are hexamethyldisiloxanes; cyclic siloxanes, such as octamethylcyclotetrasiloxane and trimethylsiloxy end-blocked polymers of dimethylsiloxanes.

In preparing the modified organopolysiloxanes of this invention, the grafting operation is most expeditiously effected by using free-radical initiators, normally organic peroxides, although azo compounds may be used in which both the nitrogen atoms of the azo linkage are attached to a tertiary-carbon atom and the remaining valences of the tertiary-carbon atom are satisfied by nitrile, carboxyl, cycloalkylene or alkyl radicals, preferably having from 1 to 18 carbon atoms. In addition to the above mentioned initiators, various forms of radiation may be used to bring about free radical formation.

The most suitable peroxide initiators are compounds of the formula: ROOH, ROOR, RCOOOR in which R is an organic radical. Specific examples of peroxides which are operative in this invention are hydroperoxides, such as t-butyl hydroperoxide, cumene hydroperoxide, and decaline hydroperoxide; dialkyl peroxides, such as di-t-butyl and dicumyl peroxide; cyclic peroxides, such as ascaridole and 1,5-dimethylhexane-1,5-peroxide; peresters, such as t-butyl perbenzoate, t-butylperoxy isopropyl carbonate, and t-butyl peroctoate; keto peroxides, such as acetone peroxide and cyclohexanone peroxide.

The amount of free-radical initiator used is not critical; thus any amount capable of producing a perceptible degree of grafting is suitable. Generally, as little as 0.05 percent of the more active peroxide initiators based on the weight of the methacrylic acid is adequate in most cases. However, where it is desirable to increase the reaction rate, then as much as 3 percent or even more of the initiator may be used.

Although the viscosity of the organopolysiloxane fluid used in the grafting step may vary over a wide range, it is preferred that the viscosity be from about 100 to about 20,000 cs. and more preferably from about 250 to about 10,000 cs. at 25° C.

The amount of methacrylic acid should be within the range of from about 0.5 to about 50 percent, perferably from about 2 to 20 percent by weight of the organopolysiloxane.

Where the viscosity of the reaction mixture exceeds about 2,000 cs., it may be desirable to use an organic solvent which boils at a temperature of from about 50°–160° C. and has a relatively low chain transfer constant. The amount of solvent may range from about 2 to 25 percent based on the weight of the composition, i.e., solvent and reactants. However, for all practical purposes, the amount of solvent is generally determined by the viscosity of the reaction mixture. Suitable solvents are aromatic hydrocarbons, e.g., benzene, toluene, xylene; chlorinated aromatic hydrocarbons, e.g., chlorobenzene; aliphatic hydrocarbons, e.g., pentane, hexane, octane; cycloaliphatic hydrocarbons, e.g., 1,1-dimethylcyclopentane; and esters, e.g., methyl acetate, ethyl acetate, propyl acetate, butyl acetate, amyl acetate, and the like.

Upon completion of the graft polymerization, the solvent may be removed by conventional techniques, such as vacuum distillation and the like to yield a polymethacrylic acid graft modified polysiloxane having thixotropic properties.

The thixotropic compositions of this invention may be used as room-temperature-curable elastomers. For example, in a one-component system, the modified polymer may be endblocked with silanes which contain functional groups that are hydrolyzable in ambient moisture. Silanes which may be used for endblocking the hydroxyl-terminated modified organopolysiloxanes may be represented by the formula:

$$X_{4-m}SiY_m$$

wherein X is a relatively unreactive group, such as alkyl, alkoxy, or aryl group; Y represents a acyloxy, oximo, alkoxy, aryloxy, halogen, aminoxy, or phosphato groups; and m is a number of from 2 to 4. The hydroxyl groups are converted to functional groups of the type:

$$OSiX_{4-m}Y_{m-1}$$

which are hydrolyzable in ambient moisture. These compositions may be cured by merely exposing them to atmospheric moisture with or without any additional water vapor at times varying from a few minutes to several hours or days.

Examples of suitable silanes which may be used in the one-component system are methyltriacetoxysilane, isoproplytriacetoxysilane, isopropoxytriacetoxysilane, methyltriacetoximosilane, methyltrisdiethylaminoxysilane, methyltris(diethylphosphato)silane, and the like.

In the two-component system, hydroxyl-terminated modified organopolysiloxanes are mixed with curing agents, such as polyalkoxysilanes of the formula:

$$(R^aO)_zSiR^b_{4-z}$$

or polyalkoxysiloxanes in which the silicon atoms are linked through Si—O—Si linkages and the remaining valences of the silicon atom are satisfied by $R^aO$ and $R^b$. In the above formula, the groups represented by $R^a$ and $R^b$ are monovalent hydrocarbon radicals having less than 8 carbon atoms and z is a value of from 3 to 4. Examples of monovalent hydrocarbon radicals are methyl, ethyl, propyl, butyl, hexyl, octyl, phenyl, vinyl, allyl, ethallyl, butadienyl, and the like. Polyalkoxysilanes used herein include mono-organotrihydrocarbonoxy silanes, tetrahydrocarbonoxy silanes, and hydrolyzates of such silanes. Examples of suitable polyalkoxy compounds are allyl silicates, e.g., ethyl orthosilicate or partially hydrolyzed ethyl silicates, such as ethyl silicate "40" which consists primarily of decaethyl tetrasilicate. Other operative curing agents are ethytrimethoxysilane, methylbutoxydiethoxysilane, propyltripropoxysilane, methyltriethoxysilane, ethyltriethoxysilane, ethyl orthosilicate and n-butyl orthosilicate. Examples of alkyl polysilicates are ethylpolysilicate, isopropylpolysilicate, butylpolysilicate, dimethyltetraethoxydisiloxane, trimethylpentabutoxytrisiloxane, and the like.

The polyalkoxysilanes and polyalkoxysiloxanes employed herein may be used either alone or in combination. They should be used in an amount of from about 0.5 to about 20 percent or preferably from about 1 to 10 percent by weight based on the weight of the organopolysiloxane. If the total weight of the polyalkoxysilanes or polyalkoxysiloxanes employed is below about 0.5 percent based on the weight of thhe modified organopolysiloxanes, the cure rate is extremely slow. If, on the other hand, the total weight of the polyalkoxysilanes or polyalkoxysilanes is above 10 percent based on the weight of the modified organopolysiloxane, the cure time will not be substantially reduced.

The modified organopolysiloxane compositions are cured by mixing the hydroxyl-terminated organopolysiloxanes with the polyalkoxysilanes or the polyalkoxysiloxanes in the presence of a catalyst, preferably a metallic salt or compound. The metallic component of the catalyst is preferably tin, but may be lead, chromium, antimony, iron, cadmium, barium, calcium, titanium, bismuth, or magnesium. Examples of suitable salts are tin naphthenate, lead octoate, tin octoate, iron stearate, tin oleate, antimony octoate, tin buyrate, and the like. Organotin catalysts which may be used include dibutyltin dilaurate, bis(dibutylphenyltin) oxide, bis(acetoxydibutyltin) oxide, bis(tributyltin) oxide, dibutoxydibutyltin, tri-t-butyltin hydroxide, triethyltin hydroxide, diamyldipropoxytin, dioctyltin dilaurate, diphenyloctyltin acetate, dodecyldiethyltin acetate, trioctyltin aceate, triphenyltin acetate, triphenyltin laurate, triphenyltin methacrylate, dibutyltin butoxychloride, and the like. These catalysts may be dispersed in a solvent and then added to the hydroxyl-terminated modified organopolysiloxanes or they may be dispersed on a suitable filter or additive and thereafter milled with a modified polymer. Examples of suitable hydrocarbon solvents are benzene, toluene, xylene, and the like. Also, halogenated hydrocarbons, such as tetrachloroethylene or chlorobenzenes; organic ethers, such as diethyl ether, dibutyl ether, and hydroxyl-free fluid polysiloxanes, may be used as solvents. It is preferred that the solvent be sufficiently volatile to evaporate off at room temperature. The amount of catalyst used in these curing systems may range from 0.05 to about 2 percent by weight, preferably from about 0.1 to about 1 percent by weight based on the weight of the composition. A mixture of two or more of the catalysts mentioned above may be used if desired. The amount of catalyst added to the composition is determined by the requirements of the particular job, especially the pot life or working time required.

Although not essential, fillers may be incorporated in these curable organopolysiloxane compositions to further improved upon the physical properties for some commercial applications. Examples of suitable fillers are fumed silicas, high-surface-area precipitated silicas, silica aerogels, as well as coarser silicas, such as diatomaceous earth, crushed quartz and the like. Other fillers which may be used are metallic oxides, such as titanium oxide, ferric oxide, zinc oxide; fibrous fillers, such as asbestos, fibrous glass, and the like. Additives, such as pigments, antioxidants, ultraviolet absorbers, and the like, may also be included in these compositions.

The thixotropic compositions of this invention may be incorporated in other organopolysiloxane fluids or curable organopolysiloxane compositions as thickening agents.

Organpolysiloxanes having thixotropic properties are especially advantageous in the sealant area. Fillers which heretofore were essential in the preparation of non-slumping sealants may be substantially reduced and even eliminated. These compositions may also be used in the formation of elastomeric gaskets, caulking compounds, and in protective coatings.

Various embodiments of this invention are further illustrated by the following examples in which all parts are by weight unless otherwise specified.

EXAMPLE 1

A reactor containing 237.5 parts of hydroxyl-terminated polydimethylsiloxane fluid (400 cs.), 12.5 parts of methacrylic acid, and 0.125 parts of tert-butyl peroctoate is purged with nitrogen and heated to 82°±3° C. for 7.3 hours with agitation. The resulting reaction product is vacuum stripped for 2 hours at 80° C. at less than 1 mm. Hg, yielding a white thixotropic polymeric material.

EXAMPLE 2

A reactor containing 200 parts of hydroxyl-terminated polydimethylsiloxane fluid (400 cs.), 50 parts of methacrylic acid, and 0.25 part of t-butyl peroctoate is heated to 80±2° C. for 6 hours. The reaction product is vacuum stripped at a temperature of 80° C. at less than 1 mm. Hg, yielding a white thixotropic polymer.

EXAMPLE 3

In accordance with the procedure described in Example 2, 200 parts of hydroxyl-terminated polydimethylsiloxane fluid (1800 cs.) is substituted for the 400 cs. fluid and heated to 80±2° C. for 7.25 hours. After removing the volatile materials, a white thixotropic product is recovered.

About 50 parts of the thixotropic product prepared above is mixed with 2.5 parts of methyltriacetoxysilane and cured at ambient temperature and humidity for 7 days, yielding a cured elastomeric material.

EXAMPLE 4

A reactor containing 225 parts of hydroxyl-terminated polydimethylsiloxane fluid (400 cs.), 25 parts of acrylic acid and 0.125 part of t-butyl peroctoate is heated to 82±2° C. for 3.5 hours. After vacuum stripping the reaciton product for 2 hours at 100° C. at less than 1 mm. Hg, a white viscous fluid containing granular solids is obtained.

Although the present invention has been defined with specific reference to the above examples, it should be understood that these examples are given merely for purposes of illustration. Other variations which become apparent to those skilled in the art are to be included in the scope of this invention.

The invention claimed is:

1. A room-temperature curable thixotropic composition comprising an organopolysiloxane having a methacrylic acid polymer pendant from a carbon atom of the organopolysiloxane in which the methacrylic acid is present in an amount of from 0.5 to 50 percent by weight based on the weight of the organopolysiloxane, said organopolysiloxane having a viscosity up to about 20,000 cs. at 25° C. and having terminal silicon bonded groups selected from the class consisting of hydroxyl groups and groups hydrolyzable by ambient moisture and being further characterized in that there are about 2.0 organic radicals per silicon atom, said organic radicals being selected from the class consisting of monovalent hydrocarbon radicals, halogenated monovalent hydrocarbon radicals and cyanoalkyl radicals in which at least one of said monovalent hydrocarbon radicals has been modified by having the methacrylic acid polymer grafted thereto.

2. The composition of claim 1 wherein the organopolysiloxane is dimethylpolysiloxane.

3. The composition of claim 1 in which the hydrolyzable groups are selected from the class consisting of amino, amido, aminoxy, oximo, halogen, aryloxy, acyloxy, alkoxy, and phosphato groups.

4. The composition of claim 1 wherein the organopolysiloxane is represented by the formula:

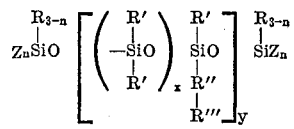

R represents monovalent hydrocarbon radicals; R' is selected from the group consisting of monovalent hydrocarbon radicals, halogenated monovalent hydrocarbon radicals, and cyanoalkyl radicals; R'' is a divalent hydrocarbon radical; R''' is a polymethacrylic acid; Z is a radical selected from the class consisting of hydrogen, hydroxyl, amino, amido, aminoxy, oximo, halogen, aryloxy, acyloxy, alkoxy, and phosphato radicals; $n$ is a number of from 1 to 3; $x$ is a number of from 0 to 20,000; and $y$ is a number of from 1 to 500.

5. The composition of claim 1 wherein the organopolysiloxane contains silicon bonded terminal hydroxyl groups and further contains a cross-linking agent selected from the class consisting of polyalkoxysilanes and polyalkoxysiloxanes and a catalyst.

6. The cured composition of claim 1 wherein the organosiloxane containing silicon bonded hydrolyzable groups is exposed to ambient moisture.

References Cited

UNITED STATES PATENTS

| | | | |
|---|---|---|---|
| 2,958,707 | 11/1960 | Warrick | 260—827 |
| 2,959,569 | 11/1960 | Warrick | 260—827 |
| 3,070,573 | 12/1962 | Beck | 260—827 |
| 3,436,252 | 4/1969 | Neuroth | 260—827 |
| 3,441,537 | 4/1969 | Lengnick | 260—827 |

SAMUEL H. BLECH, Primary Examiner

U.S. Cl. X.R.

204—159.13; 260—18, 23, 33.6, 33.8, 37, 41, 827